(12) United States Patent
Vaid et al.

(10) Patent No.: US 9,621,356 B2
(45) Date of Patent: Apr. 11, 2017

(54) REVOCATION OF ROOT CERTIFICATES (71) Applicant: Apple Inc., Cupertino, CA (US)

(72) Inventors: Yousuf H. Vaid, Fremont, CA (US); Christopher B. Sharp, Cupertino, CA (US); Medhi Ziat, San Francisco, CA (US); Li Li, Los Altos, CA (US); Jerrold Von Hauck, Windermere, FL (US); Ramiro Sarmiento, San Ramon, CA (US); Jean-Marc Padova, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/279,109

(22) Filed: May 15, 2014

(65) Prior Publication Data
US 2015/0256345 A1 Sep. 10, 2015

Related U.S. Application Data (60) Provisional application No. 61/949,172, filed on Mar. 6, 2014.

(51) Int. Cl.
*H04L 9/32* (2006.01)
(52) U.S. Cl.
CPC ................... *H04L 9/3268* (2013.01)
(58) Field of Classification Search
USPC ......................................................... 726/10
See application file for complete search history.

(56) References Cited

U.S. PATENT DOCUMENTS 7,124,170 B1 * 10/2006 Sibert ................... G06F 12/145
                                                                     709/216
7,634,654 B2     12/2009 Kakii
(Continued)

FOREIGN PATENT DOCUMENTS

JP     H11249819 A     9/1999
JP     2002016865 A     1/2002
(Continued)

OTHER PUBLICATIONS

Japanese Patent Application No. 2015-042948—Notice of ground for rejection dated Mar. 22, 2016.
(Continued)

*Primary Examiner* — Christopher Brown
(74) *Attorney, Agent, or Firm* — Downey Brand LLP (57) ABSTRACT

Disclosed herein is a technique for revoking a root certificate from at least one client device. In particular, the technique involves causing a secure element—which is included in the at least one client device and is configured to store the root certificate as well as at least one backup root certificate—to permanently disregard the root certificate and prevent the at least one client device from utilizing the specific root certificate. According to one embodiment, this revocation occurs in response to a receiving a revocation message that directly targets the root certificate, where the message includes at least two levels of authentication that are verified by the secure element prior to carrying out the revocation. Once the root certificate is revoked, the secure element can continue to utilize the at least one backup root certificate, while permanently disregarding the revoked root certificate.

20 Claims, 6 Drawing Sheets

(56) References Cited

U.S. PATENT DOCUMENTS

| | | | |
|---|---|---|---|
| 8,683,605 B1 * | 3/2014 | Tenenboym | G06F 21/645 380/30 |
| 2009/0113206 A1 | 4/2009 | Shen-Orr et al. | |
| 2013/0346747 A1 * | 12/2013 | Ignatchenko | H04L 9/3268 713/158 |

FOREIGN PATENT DOCUMENTS

| | | | |
|---|---|---|---|
| JP | 2005223892 A | 8/2005 | |
| JP | 2009232002 A | 10/2009 | |
| JP | 2010128018 A | 6/2010 | |

OTHER PUBLICATIONS

Japanese Patent Application No. 2015-042948—Final office action dated Nov. 28, 2016.

* cited by examiner

REVOCATION OF ROOT CERTIFICATES

CROSS-REFERENCE TO RELATED APPLICATIONS

The present application claims the benefit of U.S. Provisional Application No. 61/949,172, entitled "REVOCATION OF ROOT CERTIFICATES" filed Mar. 6, 2014, the content of which is incorporated herein by reference in its entirety for all purposes.

FIELD

The described embodiments set forth a technique for revoking a root certificate within one or more wireless communication devices.

BACKGROUND

Most wireless communication devices (e.g., smart phones) are configured to utilize Universal Integrated Circuit Cards (UICCs) that provide access to wireless service carriers. A UICC typically takes the form of a small removable card (e.g., a Subscriber Identity Module (SIM) card) that is inserted into a wireless communication device; however, in more recent implementations, the UICC can instead be embedded directly into a system board of the wireless communication device. According to either approach, the UICC includes at least a microprocessor and a read-only memory (ROM), where the ROM is configured to store authentication data that the microprocessor can utilize in order to interact with wireless service carriers. In general, the authentication data includes unique cryptographic keys that enable wireless service carriers to authenticate the UICC. The authentication data also includes one or more root certificates that enable the UICC, by way of the microprocessor, to authenticate different wireless service carriers prior to interacting with them.

While the foregoing approach provides a secure operating environment that is substantially resistant to failure, it may be susceptible to security breaches that are costly and cumbersome to alleviate. Consider, for example, an instance where a malicious party becomes privy to a private key associated with a root certificate that is stored by a set of UICCs (e.g., a set of UICCs having a size on the order of millions). Given the read-only nature of the memories included in the UICCs, all UICCs in the set would need to be replaced with new UICCs (storing new root certificates) in order to confine the security breach. Specifically, SIM card-based UICCs would need to be replaced with new SIM cards. Worse, wireless communication devices with embedded UICCs would, in most cases, require a complete system board replacement, despite other components of the system board likely being intact. Importantly, this process is costly, time consuming, and can significantly degrade overall customer satisfaction.

SUMMARY

Representative embodiments set forth herein disclose various techniques for revoking a specific root certificate from at least one client device. In particular, the techniques involve causing a secure element—which is included in the at least one client device and is configured to store the specific root certificate as well as at least one backup root certificate—to permanently disregard the specific root certificate and prevent the at least one client device from utilizing the specific root certificate.

One embodiment sets forth a method for revoking a root certificate from at least one client device. The method includes steps that involve receiving a request to revoke the root certificate, where the request includes an object identifier (OID) that is associated with the root certificate, determining that the at least one client device is configured to trust the root certificate, and generating a message to revoke the root certificate from the at least one client device, where the message includes the OID and is formatted in a pre-defined manner known to the at least one client device. The method further includes the steps of causing a certificate authority associated with the root certificate to sign the message with a first signature, signing the message with a second signature, and issuing the message to the at least one client device to cause a revocation of the root certificate at the at least one client device.

Another embodiment sets forth a non-transitory computer readable storage medium configured to store instructions that, when executed by a processor included in a computing device, cause the computing device to receive a request to revoke a root certificate, identify at least one client device that is configured to trust the root certificate, and generate a message to revoke the root certificate from the at least one client device, cause a first signature and a second signature to be included in the message to establish a dual authentication, and issue the message to the at least one client device to cause a revocation of the root certificate at the at least one client device.

Yet another embodiment sets forth a secure element that comprises both a memory and a processor, where the memory is configured to store at least two root certificates. The processor is configured to receive, from a managing entity, a message that is directed toward revoking a particular root certificate of the at least two root certificates, attempt to authenticate the message, and, upon authentication of the message, cause the particular root certificate to become inaccessible.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A popular approach for implementing security in a large-scale system involves pre-programming client devices with a set of root certificates, where each root certificate is associated with a source (e.g., a wireless service provider) that the client devices assume can be trusted—at least as deemed by one or more entities who oversee the client devices (e.g., a manufacturer). In particular, these root certificates enable the client devices to authenticate signatures of the trusted sources when, for example, high-risk commands (e.g., firmware and system-level software updates) are signed by the trusted sources and issued to the client devices. According to one approach, for each client device, the root certificates are programmed into a ROM included in a secure element (e.g., UICC) that is embedded within the client device. Although, in most cases, the root certificates are typically programmed into the ROM of the secure element at a time the secure element is manufactured, the techniques described herein are not so limited (i.e., the ROM can be configured at a time subsequent to its manufacture).

As previously noted herein, root certificates can be susceptible to security breaches, e.g., a malicious party can compromise a root certificate by obtaining a private key associated with the root certificate. In turn, the malicious party can sign (e.g., using the private key) and issue high-risk commands that can potentially be accepted and processed by client devices that are pre-programmed to trust the root certificate. In such instances, it can be advantageous to revoke a specific root certificate that is or may be compromised. In addition, while most root certificates are compromised by way of malicious acts, other non-malicious situations can arise where an overseer of the client devices (e.g., a managing entity) desires to revoke a particular root certificate that is trusted by the client devices. Examples of such situations can include no longer trusting the source associated with the root certificate, desiring to cease business operations with the source associated with the root certificate, and the like.

In view of the foregoing deficiencies, the embodiments described herein provide a technique for causing a client device (as well as other client devices) to permanently disregard a root certificate that is stored within a secure element of the client device. In particular, a managing entity (e.g., manufacturer) of the client device can generate a message that is directed toward revoking (i.e., permanently disabling) a root certificate that is stored within the secure element of the client device. To implement this configuration, the managing entity of the client device is configured to generate the revocation message using a particular format that is known to and can be processed by the secure element. More specifically, each revocation message can only be directed toward revoking one root certificate that is stored in the secure element, and the revocation message must be signed by 1) a certificate authority (CA) that manages the root certificate, and 2) a managing entity that is trusted by the client device. In turn, the secure element, upon receipt of the revocation message, attempts to verify each of the signatures. If the signatures are verified, the secure element carries out an operation that causes the root certificate referenced in the revocation message to become permanently disabled and inaccessible, despite, in some cases, remaining stored in the ROM of the secure element.

According to one embodiment, and to achieve the foregoing techniques, each root certificate that is pre-programmed into a ROM of a secure element is made associated with at least two intermediate certificates that are hierarchically based on the root certificate. According to one embodiment, the root certificate has associated therewith an object identifier (OID) that can be used to uniquely identify the root certificate, e.g., when a revocation message is issued. The root certificate also has associated therewith at least two intermediate certificates. Specifically, a first certificate of the at least two intermediate certificates is a revocation certificate that is maintained by the certificate authority that generates and signs the root certificate. Notably, this revocation certificate correlates to a first signature of two signatures that are included in a revocation message when a managing entity desires to revoke the root certificate at one or more client devices that utilize the root certificate. A second certificate of the two intermediate certificates is an administrative certificate that is maintained by a managing entity that is trusted by the one or more client devices. This administrative certificate is associated with a second signature of the two signatures that are included in the revocation message. Notably, this configuration of certificates and signatures provides a dual authentication mechanism that requires the certificate authority and the managing entity of the one or more client devices to both "sign-off" when issuing the message to revoke the root certificate from the one or more client devices. As a result, neither the certificate authority nor the managing entity is capable of independently revoking a root certificate from the one or more client devices.

When a revocation message is issued to one or more secure elements, the secure elements are configured to verify that the revocation message has been signed by both the certificate authority (based on the revocation certificate) and the managing entity (based on the administrative certificate). Each secure element is also configured to verify that an OID included in the revocation message matches the OID of the particular root certificate to which the revocation message is directed. Once the foregoing verifications are made, the secure element carries out a configuration update that renders the particular root certificate permanently inaccessible. As a result, any subsequent commands that are received by the secure element and include a signature that relies on the revoked root certificate for verification will be disregarded since the secure element will no longer be able access the revoked root certificate and verify the signature included in the command.

Accordingly, the foregoing approaches provide techniques for securely revoking root certificates that are stored into ROMs of secure elements included in client devices. A more detailed discussion of these techniques is set forth below and described in conjunction with FIGS. 1-6, which illustrate detailed diagrams of systems and methods that can be used to implement these techniques.

Figure 1:
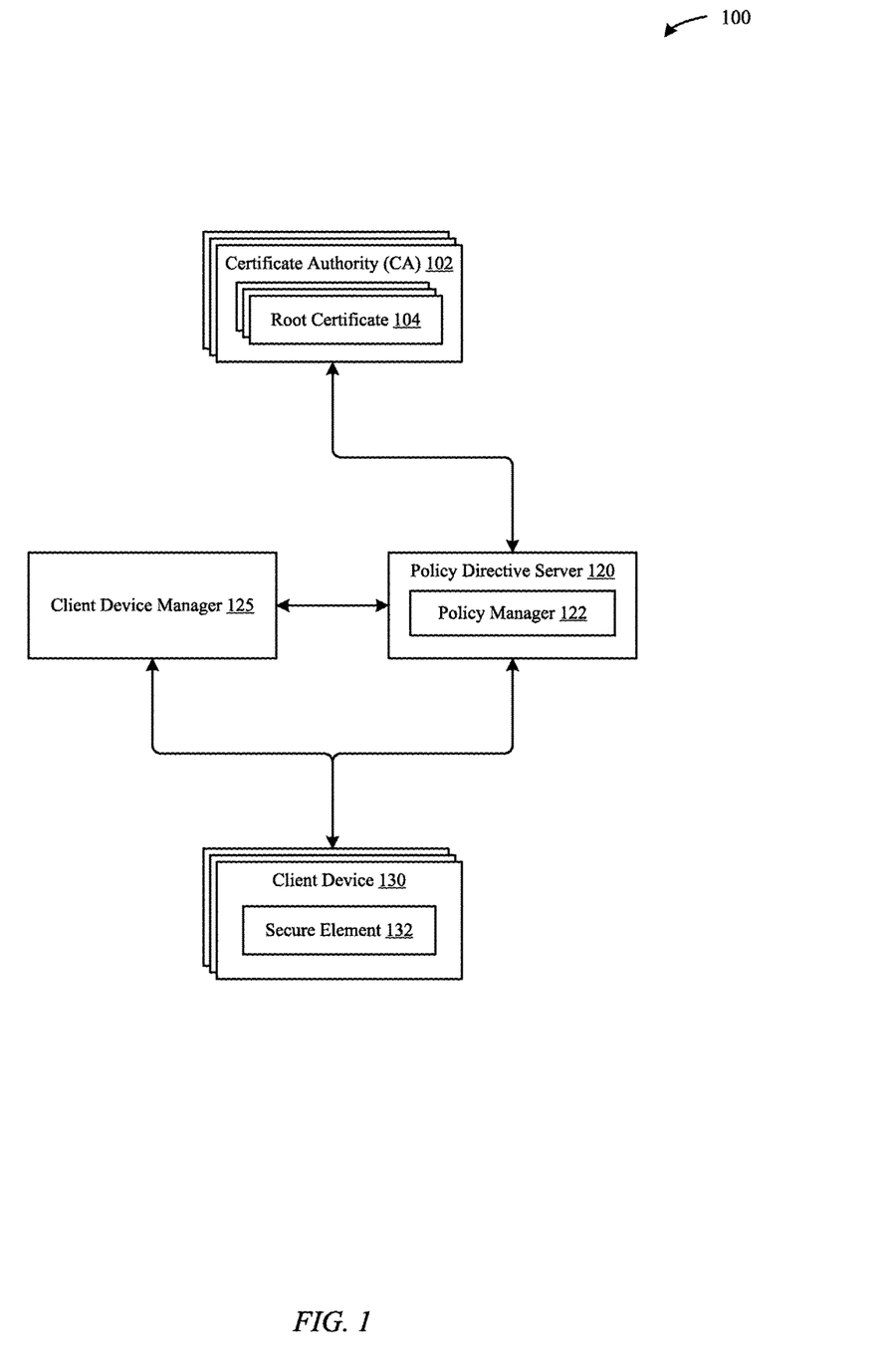
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes certificate authorities 102, a policy directive server 120, a client device manager 125, and client devices 130. According to one embodiment, each certificate authority 102 represents a distinct certificate authority that is in a position to self-sign root certificates 104 that are distributed to and trusted by the client devices 130. In particular, the root certificates 104 can be used by the client devices 130 for verifying intermediate certificates (and correlated signatures) that are signed based on the root certificates 104 and presented to the client devices 130 for authentication purposes. More specifically, the client devices 130 can be configured to receive and process commands that are signed based on the one or more of the aforementioned certificates, where the client devices 130 rely on the root certificates 104 to authenticate the commands prior to processing them.

According to one embodiment, the client device manager 125 represents a particular entity that is configured to manage the client devices 130, e.g., the client device manager 125 can be responsible for issuing firmware and software updates to the client devices 130. As shown in FIG. 1, the client device manager 125 interfaces with the policy directive server 120, which executes a policy manager 122 that is configured to generate and issue the aforementioned updates to the client devices 130. As described in greater detail below in conjunction with FIG. 2, the policy manager 122 can be configured to maintain records that indicate how different root certificates 104 are distributed across the client devices 130. In this manner, when a root certificate 104 is compromised and needs to be revoked, the policy manager 122 can identify one or more client devices 130 that store the root certificate 104 and issue a revocation message that causes the one or more client devices 130 to permanently disregard the root certificate 104.

As shown in FIG. 1, each client device 130 includes a secure element 132, which, according to one embodiment, represents a UICC that is embedded within a main system board of the client device 130. According to one embodiment, the secure element 132 is configured to be a sand-boxed hardware/software environment that cannot be directly accessed by external entities, such as a main operating system (OS) that is executing on the client device 130. Although not illustrated in FIG. 1, the secure element 132 can include a microprocessor and a storage device (e.g., a ROM) that work in conjunction to process different commands and carry out the authentication mechanisms described herein, where the storage device is configured to store each of the root certificates 104. In particular, and according to some embodiments, each secure element 132 can, by way of a certificate manager 134, be configured to store the root certificates 104 in an isolated manner in order to properly facilitate disablement of a particular one of the root certificates 104 when a revocation message is received and processed by the secure element 132.

Figure 2:
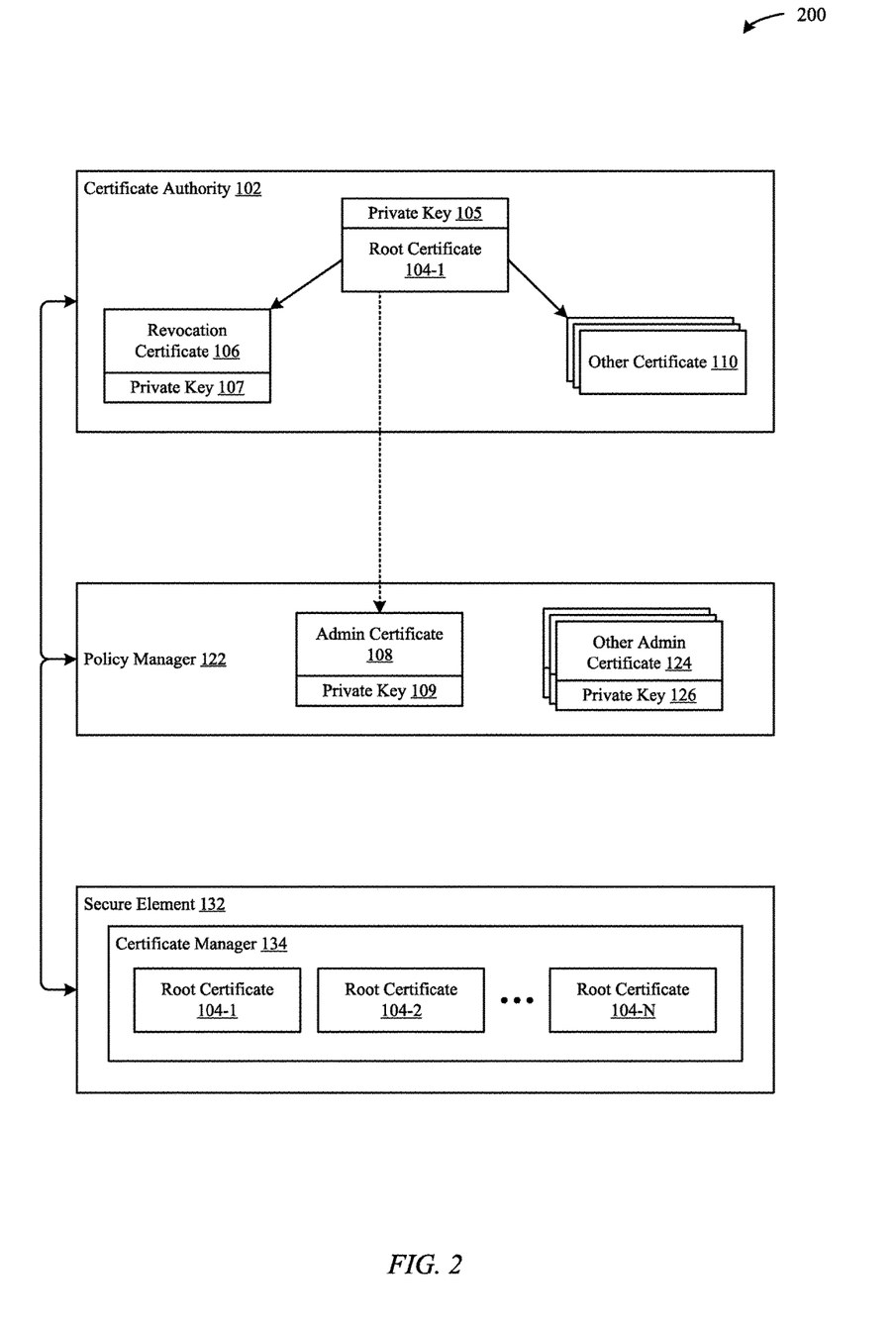
FIG. 2 illustrates a block diagram of a more detailed view of particular components of the system of FIG. 1, according to some embodiments.

FIG. 2 illustrates a block diagram of a more detailed view 200 of particular components of the system of FIG. 1, according to some embodiments. As shown in FIG. 2, one of the certificate authorities 102 of FIG. 1 stores at least one root certificate 104-1, and maintains a private key 105 that is associated with the root certificate 104-1. As is well-known, the public key counterpart to the private key 105 is stored as a field in the root certificate 104-1 and is made freely accessible to any holder of the root certificate 104-1. According to this approach, entities who trust the root certificate 104-1 (e.g., the client devices 130) can use the public key associated with the root certificate 104-1 to verify signatures that are produced based on one or more intermediate certificates—such as a revocation certificate 106 and other certificates 110—that are members of a chain of trust that anchors to the root certificate 104-1.

Notably, the revocation certificate 106 is an intermediate certificate that is signed by the root certificate 104-1 and whose private key 107 is maintained by the certificate authority 102. Specifically, this revocation certificate 106 is utilized by the certificate authority 102 when the policy manager 122 requests/instructs the certificate authority 102 to sign a revocation message that is directed toward causing revocation of the root certificate 104-1. Accordingly, since the revocation certificate 106 is an intermediate certificate to the root certificate 104-1—and the root certificate 104-1 is stored by the client devices 130—the client devices 130 can receive the revocation certificate 106 in conjunction with the revocation message and authenticate the revocation certificate 106 using the root certificate 104-1. In turn, once the revocation certificate 106 is verified, a public key included in the revocation certificate 106 can be used to verify the authenticity of a signature included in the message and based on the revocation certificate. In other words, the revocation certificate 106 can be used to verify that the certificate authority 102 did, in fact, sign the revocation message based on the revocation certificate 106 (i.e., using the private key 107), since it is assumed that the certificate authority 102 is the only entity that is in possession of the private key 107.

FIG. 2 also illustrates a more detailed view of the policy manager 122 of FIG. 1, which, as shown, includes an administrative certificate 108 as well as other administrative certificates 124. According to the illustration shown in FIG. 2, the administrative certificate 108 is associated with a private key 109, and is an intermediate certificate to the root certificate 104-1. According to one embodiment, the administrative certificate 108 represents an intermediate certificate that is generated by way of a certificate signing request (CSR) issued to the certificate authority 102 by the policy manager 122. In response, the certificate authority 102 generates the administrative certificate 108 by verifying identity information associated with the policy manager 122, and generating a certificate that is signed using the private key 105 associated with the root certificate 104-1. In turn, the generated administrative certificate 108 is provided to the policy manager 122, where the policy manager 122 maintains the associated private key 109 as a secret so that only the policy manager 122 is capable of signing messages based on the administrative certificate 108. Although not illustrated in FIG. 2, the other administrative certificates 124 (and their associated private keys 126) are managed by the policy manager 122 in a similar manner to the administrative certificate 108, and can represent intermediate certificates that each correlate to a particular root certificate managed by the certificate authority 102 or managed by another certificate authority that is trusted by the policy manager 122. Notably, these other administrative certificates 124, like the administrative certificate 108, can be used by the policy manager 122 to sign revocation messages if and when the time comes to revoke root certificates 104 on which the other administrative certificates 124 depend.

Figure 3:
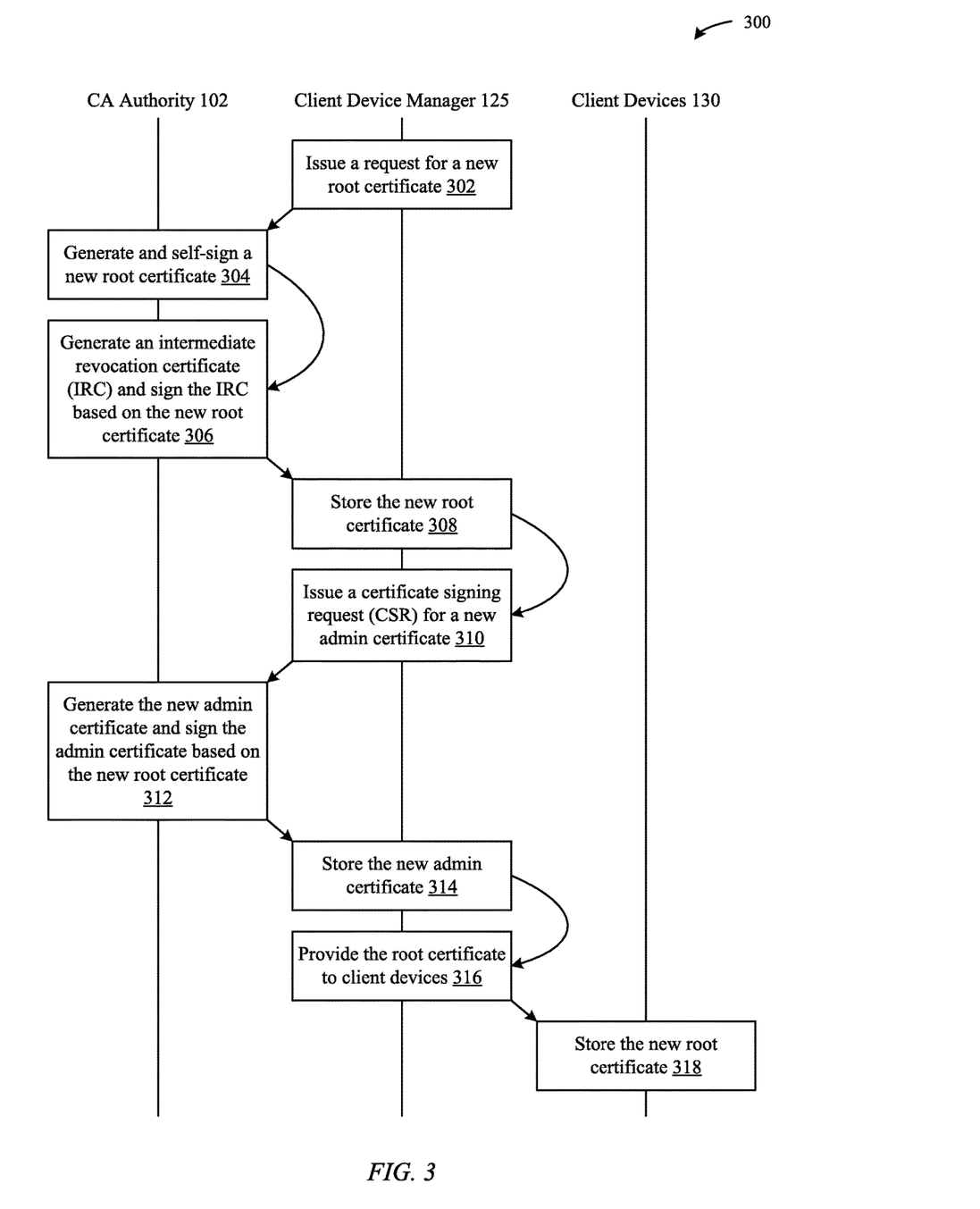
FIG. 3 illustrates a sequence diagram of a method for generating a new root certificate, as well as various intermediate certificates associated with the root certificate, and distributing the certificates to particular components of the system of FIG. 1, according to some embodiments.

FIG. 3 illustrates a sequence diagram of a method 300 for generating a new root certificate—as well as various intermediate certificates associated with the root certificate—and distributing the certificates to particular components of the system of FIG. 1, according to some embodiments. As shown, the method 300 begins at step 302, where the client device manager 125 of FIG. 1 issues to the certificate authority 102 a request for a new root certificate. This request can represent, for example, the client device manager 125 engaging with a certificate authority and requesting the generation of a root certificate that will be utilized and trusted by client devices 130 that are planned for production.

At step 304, the certificate authority 102 generates and self-signs a new root certificate (e.g., the root certificate 104-1 of FIG. 2) according to well-known techniques. At a high-level, for example, the certificate authority 102 would generate a public key and private key pair based on well-known algorithms, and establish a new root certificate that includes, for example, various fields that store identity information associated with the certificate authority 102, as well as information about a hash function that will be used to sign the new root certificate. In turn, the certificate authority 102 carries out the hash function against the new root certificate to produce a hash result, whereupon the certificate authority 102 encrypts the hash result using the private key to produce a signature. Finally, this signature is stored in the new root certificate, and can be used by bearers of the new root certificate to verify (by way of the public key) that whoever signed the new root certificate—in this case, the certificate authority 102—did, in fact, have possession of the private key when the new root certificate was signed. Moreover, this new root certificate can be used to verify the authenticity of any digital package—such as an electronic message or an intermediate certificate—that is signed using the private key of the new root certificate.

At step 306, the certificate authority 102 generates an intermediate revocation certificate—such as the revocation certificate 106 described above in conjunction with FIG. 1—and signs the intermediate revocation certificate based on the new root certificate. In particular, the certificate authority 102 generates the intermediate revocation certificate—which is associated with its own public key and private key—and then signs the intermediate revocation certificate using the private key associated with the new root certificate. According to this process, the intermediate revocation certificate becomes part of a chain of trust that links back to the new root certificate. As a result, the intermediate revocation certificate is an electronic credential that is trusted by all client devices 130 that store the new root certificate, since the public key of the new root certificate can be used by the client devices 130 to verify the authenticity of the intermediate revocation certificate when presented to the client devices 130. In turn, when the client device 130 verifies the intermediate revocation certificate, the client device 130 can further verify that any signature accompanying the intermediate revocation certificate was, in fact, produced by the certificate authority 102, since the certificate authority 102 is the only entity that has knowledge of the private key that is associated with the intermediate revocation certificate.

At step 308, the client device manager 125 stores the new root certificate so that the new root certificate can be subsequently distributed to the client devices 130. At step 310, the client device manager 125 issues a certificate signing request for a new administrative certificate, e.g., the administrative certificate 108 described above in conjunction with FIG. 2. More specifically, the client device manager 125 is configured to generate verifiable identity information associated with the client device manager 125. The client device manager 125 is also configured to generate a public and private key pair, to transmit the identity information and the public key to the certificate authority 102 with a request to generate and sign the new administrative certificate, and to store the private key in a secure location.

At step 312, the certificate authority 102 generates the new administrative certificate and signs the new administrative certificate based on the new root certificate. More specifically, the certificate authority 102, upon verification of the identity information provided by the client device manager 125, generates a new administrative certificate that includes, for example, various fields that store identity information associated with the client device manager 125, as well as information about a hash function that will be used to sign the new administrative certificate. In turn, the certificate authority 102 carries out the hash function against the new administrative certificate to produce a hash result, whereupon the certificate authority 102 encrypts the hash result to produce a signature. Finally, this signature is stored in the new administrative certificate, and the new administrative certificate is returned to the client device manager 125.

Notably, according to this process, the new administrative certificate, like the intermediate revocation certificate, becomes part of a chain of trust that links back to the new root certificate. As a result, the new administrative certificate is an electronic credential that is trusted by all client devices 130 that trust the new root certificate, since the public key of the new root certificate can be used by the client devices 130 to verify the authenticity of the new administrative certificate when presented to the client devices 130 (e.g., when a revocation message is issued according to the techniques described herein). In turn, when the client device 130 verifies the new administrative certificate by way of the new root certificate, the client device 130 can further verify that any signature accompanying the new administrative certificate was, in fact, produced by the client device manager 125, since the client device manager 125 is the only entity that has knowledge of the private key that is associated with the new administrative certificate.

At step 314, the client device manager 125 receives the new administrative certificate from the certificate authority 102 and stores the new administrative certificate. The new administrative certificate—in particular, the private key associated with the new administrative certificate—can subsequently be used by the client device manager 125 to produce a first of two signatures that are included in a revocation message that specifically targets the new root certificate for removal from the client devices 130 (e.g., subsequent to their manufacture and during their operation). As previously described herein, the second of the two signatures is provided by the certificate authority 102 using the private key associated with the intermediate revocation certificate, thereby implementing the dual authentication methods set forth herein.

At step 316, the client device manager 125 provides the new root certificate to the client devices 130. Finally, at step 318, the client devices 130 store the new root certificate. In one embodiment, storing the new root certificate to the client devices 130 involves "burning" the new root certificate into ROMs of the secure elements 132 that are included in the client devices 130. Other embodiments can include storing the new root certificate into the client devices 130 in a manner that makes it difficult or otherwise impossible to overwrite or delete the new root certificate within the memory in which it is stored.

Figure 4:
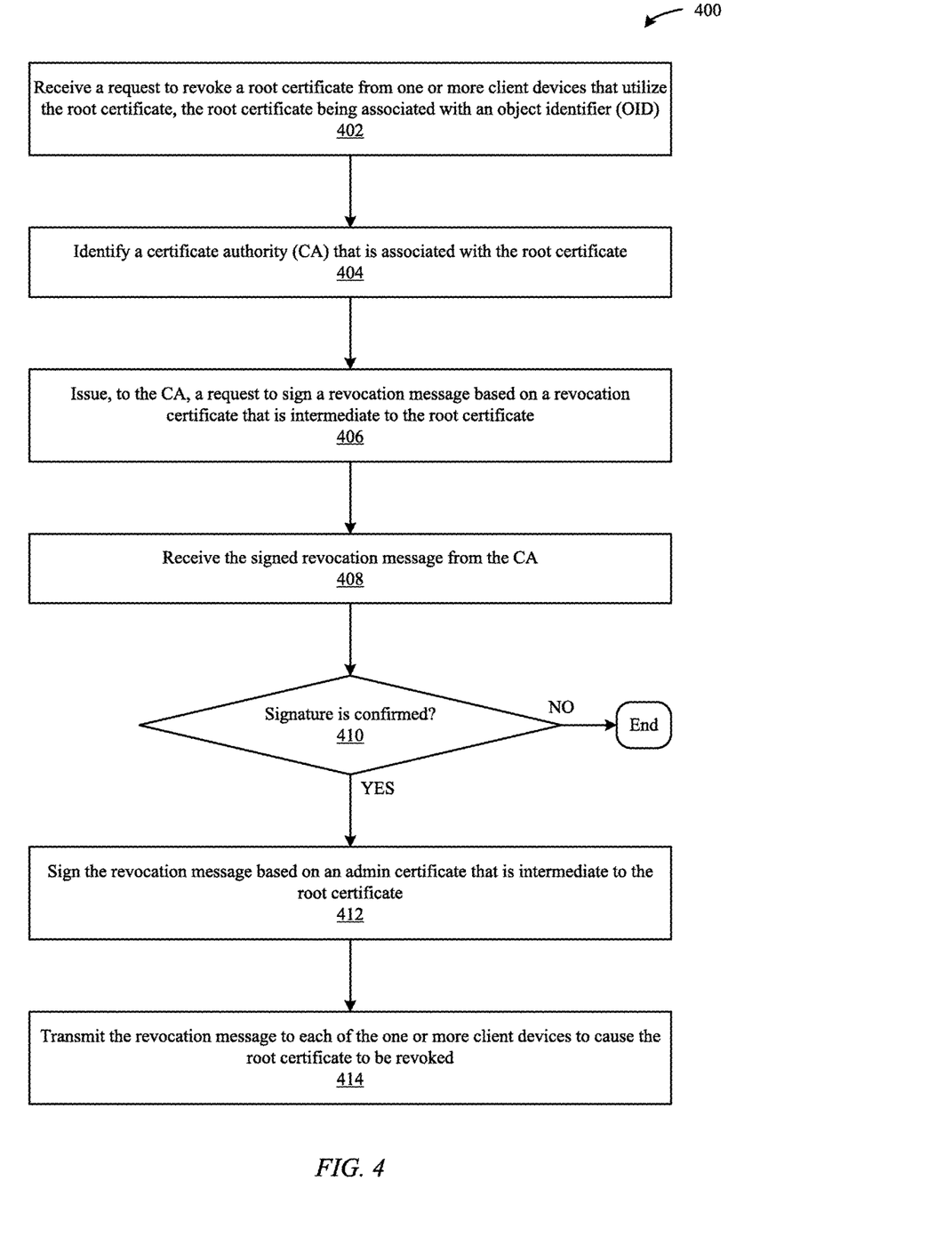
FIG. 4 illustrates a method for issuing a message to revoke a particular root certificate that is stored in one or more secure elements, according to some embodiments.
Figure 5:
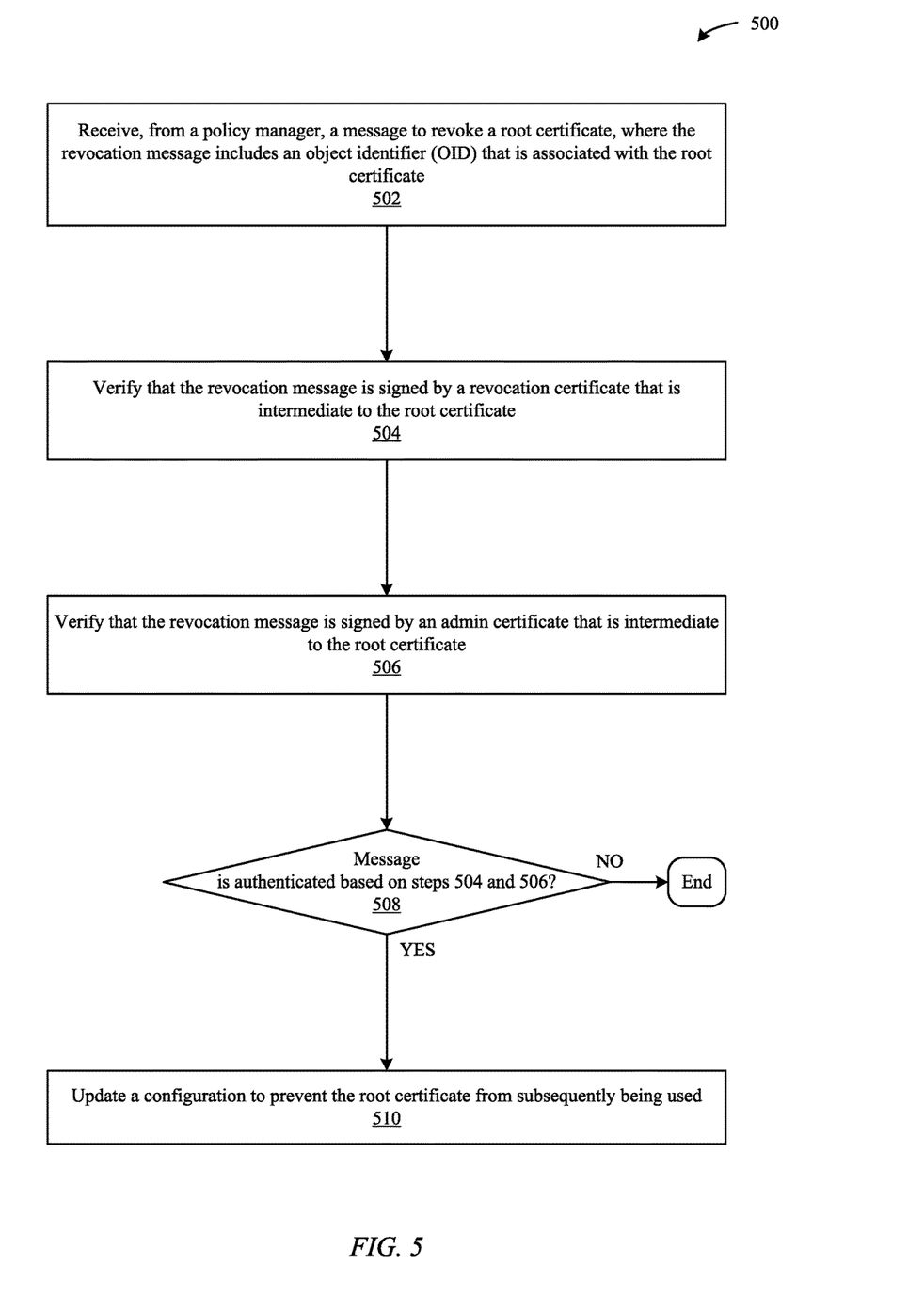
FIG. 5 illustrates a method for receiving a message to revoke a particular root certificate and carrying out the revocation of the particular root certificate, according to some embodiments.

Accordingly, FIG. 3 sets forth a sequence diagram 300 that breaks down the manner in which the new root certificate, the intermediate revocation certificate, and the new administrative certificate are generated and distributed to the various components included in the system 100. At this point, one or more client devices 130 store the new root certificate, and, in some cases, it may be desirable to revoke the new root certificate from the one or more client devices 130. FIGS. 4-5 (and the accompanying descriptions included below) set forth methods for carrying out the revocation of the new root certificate, according to various embodiments.

FIG. 4 illustrates a method 400 for issuing a message to revoke a particular root certificate 104 that is stored in one or more secure elements 132 (of client devices 130), according to some embodiments. As shown in FIG. 4, the method 400 begins at step 402, where the policy manager 122 receives a request (e.g., from the client device manufacturer 125) to revoke a root certificate 104 from one or more client devices 130 that utilize the root certificate 104, where the root certificate 104 is associated with an OID. As previously set forth herein, the OID can be implemented in a variety of manners, e.g., according to the X.509 ITU Telecommunication Standardization Sector (ITU-T) standard for public key infrastructure (PKI).

At step 404, the policy manager 122 identifies a certificate authority 102 that is associated with the root certificate 104. At step 406, the policy manager 122 issues, to the certificate authority 102, a request to sign a revocation message based on a revocation certificate (e.g., the revocation certificate 106 of FIG. 2) that is intermediate to the root certificate 104. At step 408, the policy manager 122 receives the signed revocation message from the certificate authority 102.

At step 410, the policy manager 122 determines whether the signature can be confirmed. Again, only an entity that has knowledge of the private key associated with the revocation certificate—such as the certificate authority 102—is capable of signing the revocation message in a manner that can be verified using the revocation certificate. If, at step 410, the policy manager 122 determines that the signature is confirmed, then the method 400 proceeds to step 412. Otherwise, the method 400 ends.

At step 412, the policy manager 122 signs the revocation message based on an administrative certificate (e.g., the administrative certificate 108) that is intermediate to the root certificate 104. Finally, at step 414, the policy manager 122 transmits the revocation message to each of the one or more client devices 130 to cause the root certificate 104 to be revoked, which is described in greater detail below in conjunction with FIG. 5.

FIG. 5 illustrates a method 500 for receiving a message to revoke a root certificate 104 and carrying out the revocation of the root certificate 104, according to some embodiments. As shown, the method 500 begins at step 502, where a certificate manager 134 executing within a secure element 132 of a client device 130 receives, from the policy manager 122, a message to revoke the root certificate 104, where the revocation message includes an OID that is associated with the root certificate 104.

At step 504, the certificate manager 134 verifies that the message is signed based on a revocation certificate (e.g., the revocation certificate 106 of FIG. 2) that is intermediate to the root certificate 104. At step 506, the certificate manager 134 also verifies that the revocation message is signed by an administrative certificate (e.g., the admin certificate 108 of FIG. 2) that is intermediate to the root certificate 104. At step 508, the certificate manager 134 determines whether the revocation message is authenticated based on steps 504 and 506. If, at step 508, the certificate manager 134 determines that the revocation message is authenticated based on steps 504 and 506, then the method 500 proceeds to 510. Otherwise, the method 500 ends, and the certificate manager 134 disregards the revocation message. Finally, at step 510, the certificate manager 134 updates a configuration of the secure element 132 to prevent the root certificate 104 from subsequently being used.

Figure 6:
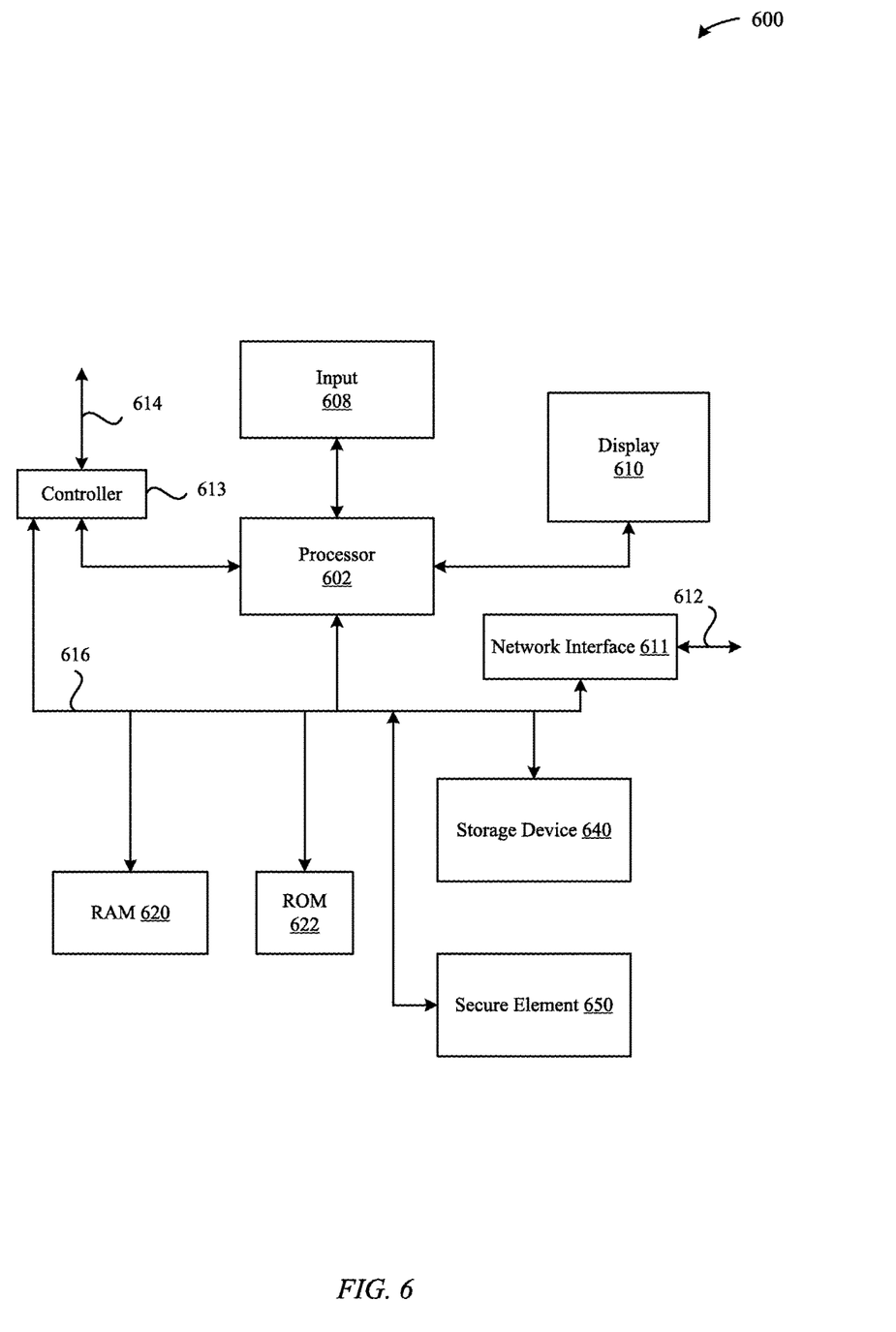
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the policy directive server 120 and the client devices 130 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the policy directive server 120 and the client devices 130. When the computing device 600 represents a client device 130, the computing device 600 further includes a secure element 650, which can represent the secure element 132 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for revoking a root certificate from at least one client device, wherein a public key provided in the root certificate is associated with a first private key, the method comprising:
   distributing an administrative certificate to the at least one client device, wherein the administrative certificate includes a certificate signature created using the first private key;
   receiving a request to revoke the root certificate, wherein the request includes an object identifier (OID) that is associated with the root certificate;
   determining that the at least one client device is configured to trust the root certificate;
   generating a message to revoke the root certificate from the at least one client device, wherein the message includes the OID and is formatted in a pre-defined manner known to the at least one client device;
   requesting that a certificate authority (CA) associated with the root certificate sign the message with a first signature using a second private key;
   signing the message with a second signature using a third private key, wherein the third private key is associated with a public key in the administrative certificate; and
   issuing the message to the at least one client device, wherein:
   i) the second private key is in possession of the CA, and
   ii) the third private key is not in possession of the CA.

2. The method of claim 1, wherein the first private key was used to self-sign the root certificate when the root certificate was generated.

3. The method of claim 2, wherein:
   the second private key is associated with a revocation certificate, the revocation certificate: i) being intermediate to the root certificate and ii) signed using the first private key, and
   the third private key is associated with an administrative certificate.

4. The method of claim 3, wherein the administrative certificate is signed using the first private key.

5. The method of claim 1, wherein the request is received from an entity that oversees operation of the at least one client device.

6. The method of claim 3, wherein the message further includes both the revocation certificate and the administrative certificate.

7. The method of claim 1, further comprising:
   receiving a second administrative certificate signed with a fourth private key.

8. A non-transitory computer readable storage medium configured to store instructions that, when executed by a processor included in a computing device, cause the computing device to:
   distribute an administrative certificate to the at least one client device, wherein the administrative certificate includes a certificate signature created using a first private key;
   receive a request to revoke a root certificate, wherein a public key provided in the root certificate is associated with the first private key;
   identify at least one client device that is configured to trust the root certificate;
   generate a message to revoke the root certificate from the at least one client device;
   request a first signature from a certificate authority (CA) associated with the root certificate:
   create a second signature using a third private key, wherein the third private key is associated with a public key in the administrative certificate;
   include the first signature and the second signature in the message to establish a dual authentication, wherein the first signature was created using a second private key; and
   issue the message to the at least one client device, wherein:
   i) the second private key is in possession of the CA, and
   ii) the third private key is not in possession of the CA.

9. The non-transitory computer readable storage medium of claim 8, wherein the first private key was used to self-sign the root certificate when the root certificate was generated.

10. The non-transitory computer readable storage medium of claim 9, wherein:
    the second private key is associated with a revocation certificate, the revocation certificate beings: i) intermediate to the root certificate and ii) signed using the first private key, and
    the third private key is associated with an administrative certificate.

11. The non-transitory computer readable storage medium of claim 10, wherein the administrative certificate is signed using the first private key.

12. The non-transitory computer readable storage medium of claim 8, wherein the request is received from an entity that oversees operation of the at least one client device.

13. The non-transitory computer readable storage medium of claim 10, wherein the message further includes both the revocation certificate and the administrative certificate.

14. A secure element, comprising:
a memory, wherein the memory is configured to store at least two root certificates; and
a processor, wherein the processor is configured to:
  receive, from a managing entity, a message comprising an administrative certificate, wherein the administrative certificate includes a certificate signature created using a first private key;
  receive, from a managing entity, a message that is directed toward revoking a particular root certificate of the at least two root certificates, wherein the particular root certificate is associated with the first private key;
  attempt to verify that the particular root certificate is revoked; and
  upon verification that the particular root certificate is revoked:
    perform a configuration update,
wherein:
  i) the particular root certificate comprises a first public key associated with a first private key,
  ii) the particular root certificate is associated with a certificate authority (CA),
  iii) the message comprises a first signature and a second signature,
  iv) the first signature is generated based on a second private key,
  v) the second signature is generated based on a third private key,
  vi) the second private key is in possession of the CA, and
  vii) the third private key is not in possession of the CA.

15. The secure element of claim 14, wherein the secure element is included in a mobile device.

16. The secure element of claim 15, wherein the secure element cannot be directly accessed by entities included in the mobile device that are external to the secure element.

17. The secure element of claim 14, wherein the memory is a read-only memory (ROM).

18. The secure element of claim 14, wherein the message includes an object identifier (OID) that targets the particular root certificate.

19. The secure element of claim 18, wherein the first signature is associated with a revocation certificate, the second signature is associated with an admin certificate, and both the revocation certificate and the admin certificate are members of a chain of trust that anchor to the particular root certificate.

20. The secure element of claim 14, wherein the configuration update causes the particular root certificate to become inaccessible to the secure element.

* * * * *